Oct. 5, 1937.    M. D. DOUGLASS    2,095,182
AGRICULTURE MACHINE
Filed April 9, 1937    5 Sheets-Sheet 1

Fig. 1.

Inventor
MALCOLME D. DOUGLASS,
By Kimmel & Crowell
Attorneys

Fig. 2.

Oct. 5, 1937. M. D. DOUGLASS 2,095,182
AGRICULTURE MACHINE
Filed April 9, 1937  5 Sheets-Sheet 4

Inventor
MALCOLME D. DOUGLASS,
By Kimmel & Crowell
Attorneys.

Oct. 5, 1937.                M. D. DOUGLASS                2,095,182
                            AGRICULTURE MACHINE
                          Filed April 9, 1937         5 Sheets—Sheet 5

Inventor
MALCOLME D. DOUGLASS,

By Kimmel & Crowell
        Attorneys

Patented Oct. 5, 1937

2,095,182

UNITED STATES PATENT OFFICE 2,095,182

AGRICULTURE MACHINE

Malcolme D. Douglass, Sylvester, Tex.

Application April 9, 1937, Serial No. 136,002

12 Claims. (Cl. 97—47)

This invention relates to an agriculture machine of the self-propelled type.

The invention has for its object to provide, in a manner as hereinafter set forth, a machine of the class referred to having means respectively for suspending front ground working devices at each side thereof in proximity to its front, one or more ground working devices from its rear substantially in middle or central relation thereto, one or more ground working devices at the rear of one side thereof and one or more ground working devices at the rear of the other side thereof and means respectively whereby the ground working devices at the front of one side of the machine may be shifted independently of the ground working devices at the front of the other side thereof to and from ground working position and independently of the rear ground working devices, the central rear ground working device shifted independently of all of the other ground working devices to and from ground working position, the front and rear ground working devices at one side of the machine shifted in unison to and from ground working position independently of the front and rear ground working devices at the other side thereof and the central or middle rear ground working device, and for all of the ground working devices elevated simultaneously to clear the ground.

A further object of the invention is to provide, in a manner as hereinafter set forth, a self-propelled agriculture machine including front and rear ground working devices at each side thereof and with the front devices on one side capable of being made active independently of the other of the said devices and with the front and rear devices on one side capable of being made active in unison independently of the ground working devices on the other side.

Further objects of the invention are to provide, in a manner as hereinafter set forth, a self-propelled machine of the class referred to which is strong, durable, thoroughly efficient in its use, enabling for the convenient adjusting of forward and rear ground working devices, providing for the carrying of ground working devices of different forms, capable for the expeditious substitution of one form of ground working device for another, readily controlled and comparatively inexpensive to set up.

With the foregoing and other objects in view, the invention consists of the novel construction, combination and arrangement of parts as will be more specifically referred to and as illustrated in the accompanying drawings wherein is shown an embodiment of the invention, but it is to be understood that changes, variations and modifications may be resorted to which fall within the scope of the invention as claimed.

The machine includes a propelling means therefor in the form of a tractor 1 of any suitable type. As shown tractor 1 has its frame indicated at 2, its rear wheels at 3, 4, its front wheels at 5, 6, its differential mechanism at 8 and its steering mechanism at 9 which is connected in a suitable manner (not shown) to a pivoted carrier 10 for the front wheels 5, 6 which are disposed at opposite inward inclinations from top to bottom. The housing 11 of the differential mechanism is formed with a pair of oppositely disposed laterally extending tubular extensions 12, 13 for the rear axles 13ª which operate a driving means (not shown) for the spindles 14 upon which the rear wheels 3, 4 are mounted. A seat post 14ª is fixed to housing 11 and carries a seat 15.

As shown the machine includes a pair of downwardly inclined spaced rearwardly extending forward beams 16, 17 of like form and of angle contour located adjacent one side of the frame 2 and a pair of downwardly inclined spaced rearwardly extending forward beams 18, 19 of like form and of angle contour located adjacent the other side of frame 2. Each of the beams 16, 17 includes an upstanding upper leg 20 and a horizontally disposed lower leg 21. The leg 20 extends at a forward inclination from its lower to its upper end. The leg 21 merges at its forward end into the lower end of leg 20. The legs 20 of the beams 16, 17 are disposed in parallelism. The legs 21 of the beams 16, 17 are oppositely outwardly inclined. Each of the beams 18, 19 includes an upstanding upper leg 22 and a horizontally disposed lower leg 23. The leg 22 extends at a forward inclination from its lower to its upper end. The leg 23 merges at its forward end into the lower end of leg 22. The legs 22 of beams 18, 19 are disposed in parallelism. The legs 23 of the beams 18, 19 are oppositely outwardly inclined.

The legs 21, 23 are adapted to have adjustably secured thereto one or more ground working devices. As shown by way of example, each leg 21 has adjustably secured therewith on its inner side, as at 24 the shank 25 of a single ground working device 26 which may be of any suitable form and each leg 23 has adjustably secured thereto, as at 27, 28 the shanks 29, 30 respectively of a pair of ground working devices 31, 32 respectively of any suitable form. The ground working devices 31, 32 on each leg 23 are arranged one in advance of the other and on opposite sides of the leg.

Extending transversely of the lower face of frame 2 in proximity to the forward end of the latter is a tubular bearing 33 of a length to extend from the sides of the frame. The end terminal portions of bearing 33 are mounted in hangers 34 which are anchored to the sides of the frame. The bearing 33 at spaced points intermediate its end is secured with frame 2 by the spaced holdfast means 34ª. Extending diametrically of bearing 33, at the transverse median of the latter is a jamb bolt or pin 34ᵇ. Journaled in and projecting from the ends of the bearing 33 is a pair of oppositely extending rock-shafts 35, 36. Oppositely disposed upstanding anchoring members 35ª are secured to the forward ends of the outer faces of the sides of frame 2 and formed with outwardly inclined parts 36ª which are provided with superposed notches 36ᵇ. The parts 36ª extend from frame 2. The outer ends of the shafts 35, 36 are journaled in bearings 36ᶜ formed at the rear ends of combined bracing and supporting elements 36ᵈ of like form and substantially of frame-like triangular contour. The forward ends of the elements 36ᵈ are open. The bearings 36ᶜ close the rear ends of elements 36ᵈ. These latter extend inwardly at an inclination from the bearings 36ᶜ to their forward ends. Each element 36ᵈ includes top and bottom bars 36ᵉ, 36ᶠ having threaded forward end terminal portions 36ᵍ which extend through the superposed notches 36ᵇ of a part 36ª and carry a take-up nut 36ʰ and a lock nut 36ⁱ.

The legs 20 of the beams 16, 17 have their upper ends adjustably secured to spaced split coupling members 37 which are adjustably secured to shaft 36. Fixed to and bodily shifting with shaft 36 is the lower end of an upstanding rearwardly inclined lever 39 which functions to elevate and lower the beams 16, 17 in unison. The lever 39 is of rectangular frame-like contour and has its lower end arranged between the members 37. Carried by the lower ends of the legs 20 of the beams 16, 17 are sectional rearwardly inclined collars 40 having the lower ends of a pair of upstanding lifting bars 41 pivotally connected thereto, as at 42. The sections of each collar are detachably secured together in encompassing relation with respect to a beam by the holdfast means 42ª. The bars 41 extend inwardly towards each other at an inclination and have their upper ends pivotally connected to the upper end of lever 39, as at 43. The forward side of lever 39 is provided with a cross piece 44 for a purpose to be referred to.

The legs 22 of the beams 18, 19 have their upper ends adjustably secured to spaced split coupling members 45 which are adjustably connected to the shaft 35. Fixed to and bodily shifting with shaft 35 is the lower end of an upstanding rearwardly inclined lever 47 which functions to elevate and lower the beams 18, 19 in unison. The lever 47 is of rectangular frame-like contour and has its lower end arranged between the members 45. Carried by the lower ends of the legs 22 of the beams 18, 19 are sectional rearwardly inclined collars 48 which are detachably secured in encompassing relation with respect to the beams 18, 19, by the holdfast means 49. Pivotally connected, as at 50 to the collars 48 are the lower ends of a pair of upstanding lifting bars 51 which extend towards each other at an inclination from their lower to their upper ends and have their upper ends pivotally connected to the upper end of lever 47, as at 52. The forward side of lever 47 is provided with a cross piece 53 for a purpose to be referred to.

The machine includes a pair of vertically disposed inverted yokes 54, 55 which are disposed laterally with respect to opposite sides of the tractor frame 2. The upper portion of the inner side of each yoke is anchored to a side of the tractor frame 2 between the transverse median and rear end of such frame. The yokes 54, 55 are disposed in depending relation with the tractor frame.

Figure 1:
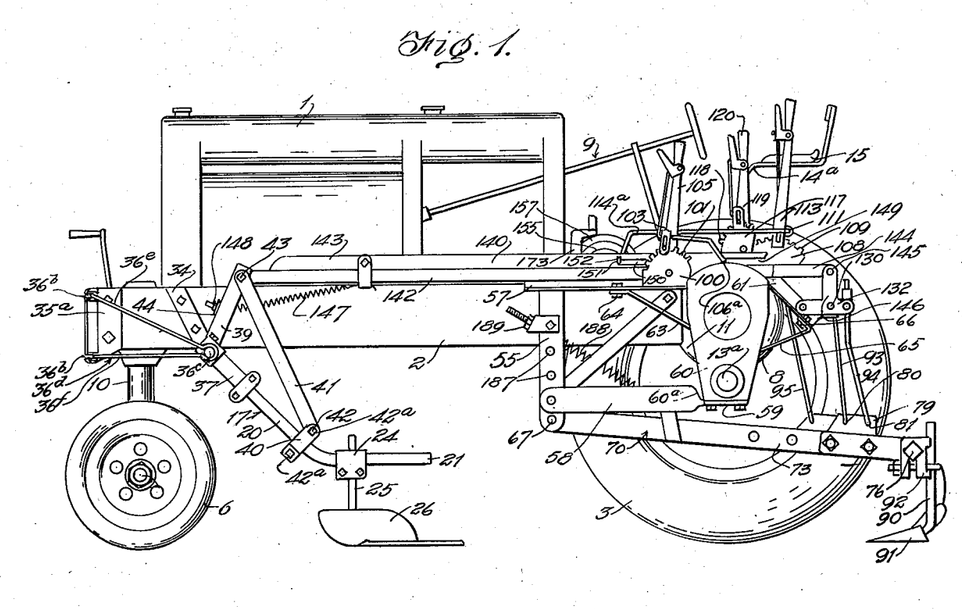
Figure 1 is a side elevation of the machine with one of the rear wheels removed.
Figure 2:
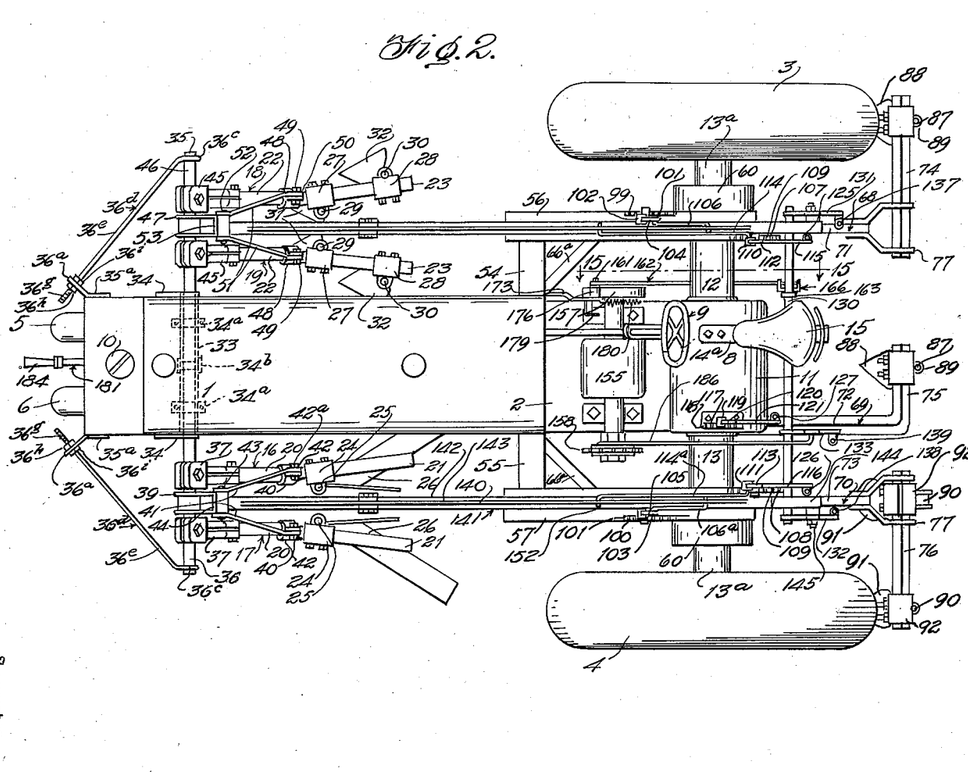
Figure 2 is a top plan view thereof.
Figures 3, 4, 6, 7, 8, 9:
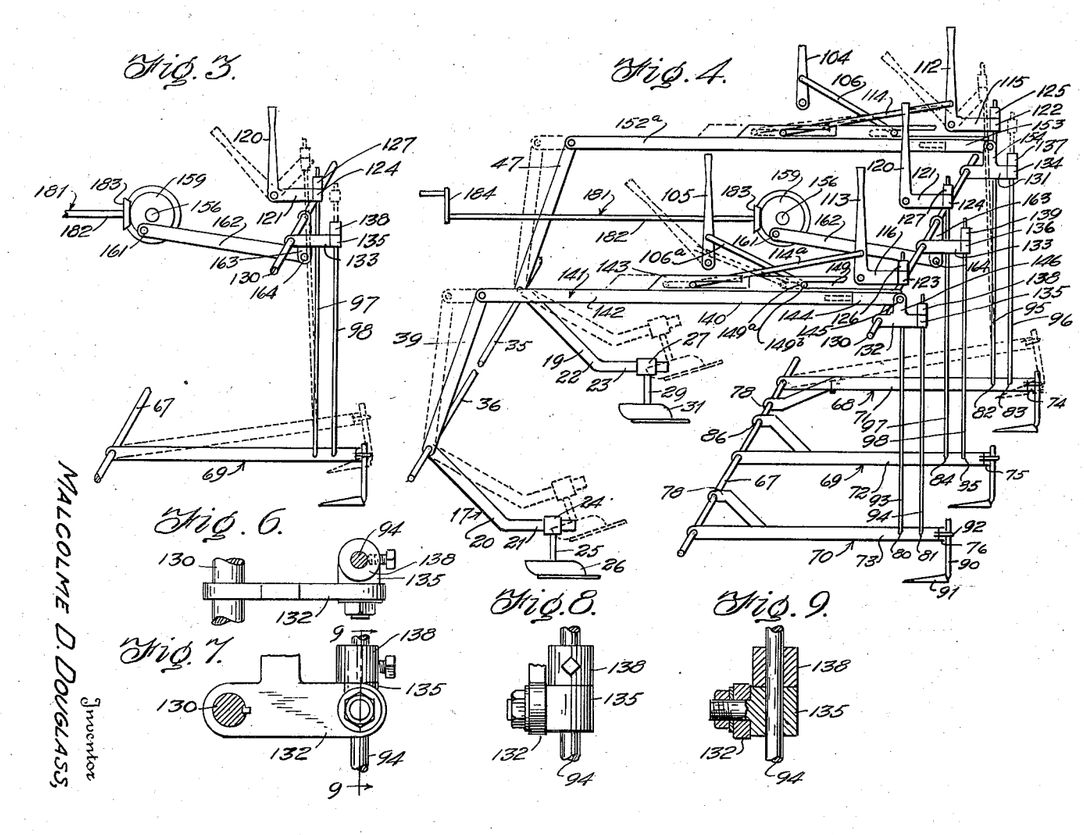
Figure 3 is a diagrammatic view illustrating the intermediate rear ground working device and its elevating and lowering means. The ground working device and its elevating and lowering means are shown in active position in full lines and in inactive position or elevated position in dotted lines.
Figure 4 is a view similar to Figure 3 of the outer rear ground working devices, the forward ground working devices and the elevating and lowering means for the said devices. The full line showing of the ground working devices indicates their active position. The dotted line showing of certain of the ground working devices indicates their inactive position.
Figures 6, 7, 8 and 9 are respectively a top plan view, a side elevation, a rear elevation and a section on line 9—9 Figure 7 of the connection between a lift bar for a ground working device and a crank arm associated with the bar.
Figures 5, 10, 11, 12, 13:
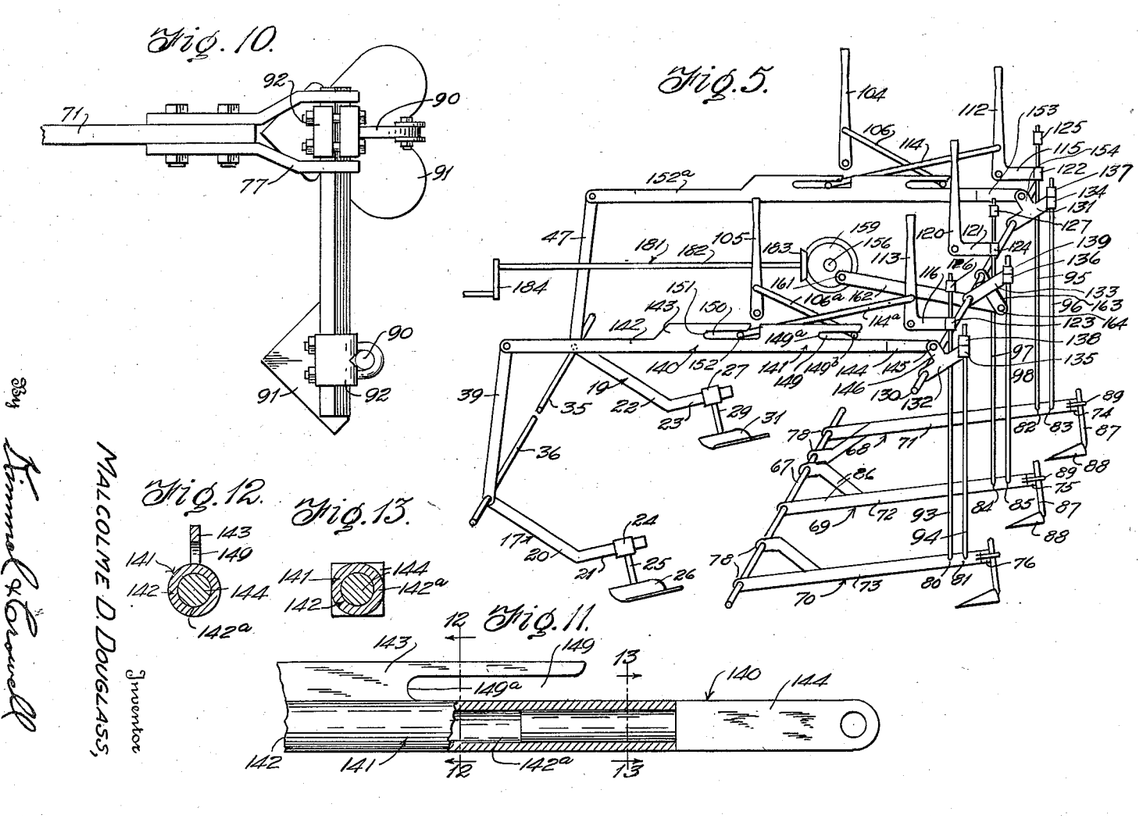
Figure 5 is a diagrammatic view illustrating the forward and rear ground working devices when elevated in unison from active position.
Figure 10 is a fragmentary view in top plan illustrating the carrier for the rear ground working devices.
Figure 11 is a fragmentary view, partly in side elevation and in longitudinal section of the telescopic combined coupler and shifter element for selectively shifting, or in unison, forward and rear ground working means or devices.
Figure 12 is a section on line 12—12, Figure 11.
Figure 13 is a section on line 13—13, Figure 11.
Figure 14:
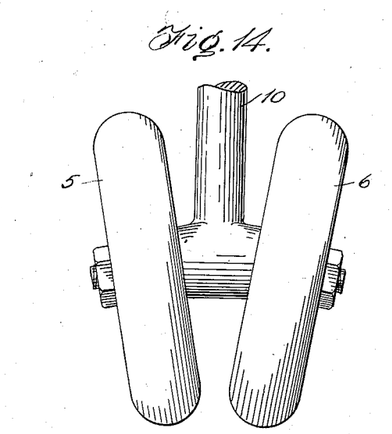
Figure 14 is a front elevation of the front wheels.

Anchored to the upper ends of yokes 54, 55 and spaced from tractor frame 2 are the rearwardly extending oppositely disposed angle beams 56, 57 which are also anchored upon and extend rearwardly from the tubular extensions 12, 13 of the differential housing 11. The outer sides of and adjacent the bottom of the yokes 54, 55 have anchored thereto the forward ends of brace members 58 (only one shown with respect to the yoke 55). The rear ends of members 58 are secured as at 59 to the bottoms of the housings 60 for the driving or transmission means for the spindles 14. The rear end terminal portions of the angle beams are bent downwardly as at 61 (Figure 1). Secured to the lower face of each of said angle beams is the forward end of a brace member which extends under a part of a housing 60 and has an upturned rear end terminal portion which is anchored to the rear end of an angle beam. But one brace member is shown (Figure 1) and it is illustrated as set up in connection with the angle beam 57. The brace member is indicated at 63, the anchoring means for its forward end at 64, its upturned rear terminal portion at 65 and the anchoring means between its rear end and the rear end of angle beam 57 at 66. Inclined brace members 66ᵃ (Figure 2) are secured at their lower ends to the inner sides of the yokes 54, 55 and to the sides of the tractor frame 2. Supported by the lower ends of the yokes 54, 55 is a shaft 67 for pivotally supporting the forward ends of a set of spaced rear beams 68, 69 and 70. Each beam is of angle contour. The beams 68, 70 are the outer rear beams and the beam 69 the center or intermediate rear beam. The beams 68, 70 are oppositely disposed. The beam 69 is arranged in the same manner as one of the outer rear beams and is shown by way of example as disposed in the same manner as the beam 70. The beams 68, 69, 70 are formed of forward legs 71, 72, 73 respectively, disposed in lengthwise relation with respect to the tractor 1 and rear legs 74, 75, 76 respectively disposed in transverse relation with respect to the tractor. The rear legs of the rear beams are disposed at right angles to the rear ends of the forward legs of such beams and are of polygonal contour in vertical section. The leg 75 of beam 69 is of less length than either of the legs 74, 76. The rear ends of the legs 71, 73 are of open flared contour as at 77 (Figure 10). The forward ends of the legs 71, 73 are enlarged and have a two-point suspension as at 78 (Figure 4) on the shaft 67. The legs 71, 72, 73 adjacent their rear ends are formed with upstanding extensions provided with openings. The extensions are illustrated in connection with the leg 72 and the leg 73. The extension on leg 73 is indicated at 79 and the openings therein at 80, 81, however, the openings forming a part of legs 71, 72 are shown in Figures 4 and 5 and indicated at 82, 83 and 84, 85 respectively. The leg 72 has an open flared forward end 86 to form a two-point suspension therefor on shaft 67.

The legs 74, 75, 76 of the beams 68, 69, 70 are to have adjustably connected therewith one or more vertically adjustable ground working devices of any suitable form. By way of example, the leg 74 and the leg 75 have associated therewith the shank 87 of a ground working device 88 adjustably connected to a coupler 89 which is adjustably secured to the leg 74 or 75 and the leg 76 is to have associated therewith the shanks 90 (Figure 10) of a pair of ground working devices 91 adjustably connected to couplers 92 which are adjustably secured to the leg 76.

Mounted in the openings 80, 81 (Figure 5) are the lower ends of a pair of upstanding lifting bars 93, 94 respectively. The bar 93 is arranged forwardly of bar 94. Mounted in the openings 82, 83 are the lower ends of a pair of lifting bars 95, 96 respectively. The bar 95 is arranged forwardly of bar 96. Mounted in the openings 84, 85 are the lower ends of a pair of lifting bars 97, 98 respectively. The bar 97 is arranged forwardly of the bar 98. The bars 93, 95 and 97 provide for independently lifting the beams 70, 69, 68 respectively relative to each other. The bars 94, 96 and 98 provide for lifting the beams 70, 69, 68 in unison. The elevating and lowering means for independently lifting and lowering the beams 68, 69, 70 and the elevating and lowering means for lifting the beams 68, 69, 70 in unison will be presently referred to.

Secured to the angle beams 56, 57 (Figures 1 and 2) between their transverse medians and rear ends are vertically disposed semi-circular plates 99, 100 respectively having their curved edges toothed throughout to form racks as at 101. Spring controlled pawl and lever mechanisms 102, 103 associate with the racks. The levers 104, 105 of said mechanisms are pivoted at their lower ends to the plates 99, 100 respectively. The levers 104, 105 have pivotally connected thereto the forward ends of rearwardly extending shifting arms 106, 106ᵃ for a purpose to be referred to. The plates 99, 100 are arranged on the outer sides of the beams 56, 57. Secured to the inner sides of the beams 56, 57 rearwardly of the plates 99, 100 are vertically disposed semi-circular plates 107, 108 having their curved edges toothed throughout to form racks, as at 109. Spring controlled pawl and lever mechanisms 110, 111 associate with the racks 109. The levers 112, 113 of the mechanisms 110, 111 are pivotally connected at their lower ends to the plates 107, 108 respectively. The levers 112, 113 have pivotally connected thereto the rear ends of forwardly extending shifting arms 114, 114ᵃ for a purpose to be referred to. The levers 112, 113 have formed integral therewith rearwardly extending crank arms 115, 116 (Figure 5) for a purpose to be referred to. Secured on the top of differential housing 11 is an upstanding semi-circular plate 117 having its circular edge toothed throughout to form a rack as at 118. A spring controlled pawl and lever mechanism 119 associates with the rack 118. The lever 120 of mechanism 119 is pivotally connected at its lower end to the plate 117 and has formed integral therewith a rearwardly extending crank arm 121 (Figure 5) for a purpose to be referred to.

The crank arms 115, 116, 121 have laterally disposed eyes 122, 123 and 124 (Figure 5) respectively at their rear ends. The lifting bars 95, 97, 93 have their upper ends extended through the eyes 122, 123, 124 respectively. The bars 95, 97, 93 carry fixed abutment collars 125, 126, 127 respectively above the crank arms 115, 116, 121. When the crank arms are elevated the collars coact with the arms whereby the bars are lifted.

The depending rear terminal portions 61 of the angle beams 54, 55 carry bearings in which is revolubly mounted a shaft 130 to the ends of which are secured rearwardly extending inverted T-shaped lift members 131, 132 and between its transverse median and one of its ends the shaft 130 is provided with a rearwardly extending inverted T-shaped member 133. The rear ends of members 131, 132, 133 are formed with vertical eyes 134, 135, 136 respectively through which extend the upper terminal portions of lift bars 96, 98, 94 respectively. The upper ends of rods 96, 98, 94 respectively have fixed thereto collars 137, 138, 139 respectively which constitute abutments arranged above the eyes on the rear ends of members 131, 132, 133. When shaft 130 is moved in a direction, by a means to be referred to, to elevate the rear ends of the lift members, the lift bars 96, 98, 94 will be carried upwardly together and elevate in unison the rear ends of the beams 68, 69, 70 to shift the ground working devices carried by these latter clear of the ground. When the rear ends of the beams 68, 69, 70 are elevated in unison, the rear ends of the beams 16, 17, 18 and 19 are elevated in unison with the rear ends of the other beams and the ground working devices carried by the beams 16, 17, 18 and 19 will be lifted clear of the ground. The means to provide for lifting the rear ends of the beams 16, 17, 18 and 19 simultaneously with the lifting of the rear ends of the beams 68, 69 and 70 will be presently referred to.

The beams 16, 17 are arranged forwardly of the beam 70. The beams 18, 19 are arranged forwardly of the beam 68. There is common to the beams 16, 17, 70 a telescopic element 140 arranged on one side of the tractor frame which functions when lever 105 is operated in a forward direction to elevate the beams 16, 17 independently of beam 70 and when lever 113 is operated in a forward direction to elevate beams 16, 17 and 70 in unison. The element 140 (Figure 11) includes a front section 141 including a lower part 142 having a tubular rear portion 142a. The section 141 includes a vertical flange 143 on the top of part 142. The flange 143 is disposed lengthwise of and is of less length than part 142. The element 140 includes a rear section 144 which is pivotally connected at its rear end, as at 145, to the stem 146 of the lift member 132. The section 144 extends into the tubular rear portion of section 141. The forward end of section 141 extends into the upper end of and is pivotally connected to lever 39. The element 140 includes a controlling spring 147 which is fixed at its rear end to the section 141 and at its forward end is attached to a tensioning means 148 therefor which is mounted in the cross piece 44 carried by lever 39. The arm 106a on lever 105 has its rear end slidably mounted in a rear cutout 149 in flange 143 which provides a shoulder 149a against which the end 149b of arm 106a is adapted to abut to shift section 141 forwardly. The latter is shiftable independent of and in unison with section 144 as the latter when it is shifted forwardly abuts and carries section 141 therewith. The flange 143 is formed with a cutout 150 which provides a shoulder 151. The cutout 149 is arranged rearwardly of cutout 150. The arm 114a which extends forwardly from 113 has an angularly disposed forward end 152 (Figure 2) which rides in the cutout 150 and is adapted to abut shoulder 151. When lever 105 is moved forwardly the arm 106a is carried in a like direction which shifts section 141 of element 140 forwardly and which in turn will move lever 39 in a direction to elevate the rear ends of beams 16, 17 and which action is had independently of a shift to beam 70. When lever 113 is shifted forwardly the rear end of crank arm 117 will be elevated carrying lifter bar 93 therewith which in turn will elevate the rear end of beam 70 and move the ground working devices carried thereby clear of the ground. As lever 113 is moved forwardly the arm 114a carried thereby will abut shoulder 151 and cause the section 141 of element 140 to act on lever 39 in a manner to elevate the rear ends of the beams 16, 17 to move the ground working devices 26 clear of the ground. The arrangement aforesaid will provide for lifting the ground working devices 26 independent of the ground working devices 90, 91 and for lifting these latter in unison with the device 26.

The other side of the traction frame is provided with a spring controlled telescopic element 152a of the same construction and arrangement as the element 140, functions for the same purpose as and is disposed in relation to beams 18, 19, 68, arms 106, 114, levers 104, 112, as the element 104 is with respect to beams 16, 17, 70, arms 106a, 114a, levers 105, 112. It is unnecessary to specifically set forth the construction and arrangement of element 152a, but to say that element 152a provides for independently lifting beams 18, 19 with respect to beam 68 and for lifting beams 18, 19 and 68 in unison. It will be stated that the rear section 153 of element 152a is pivotally connected to the stem 154 of lift member 131 (Figure 4).

When the shaft 130 is moved in a direction to elevate the rear ends of lift members 131, 132 and 133 to provide in connection with the lift rods 93, 95, 97 for the elevating of the rear ends of the beams 68, 69 and 70, the upper ends of the stems 146, 154 of the lift members 132, 130 move forwardly carrying the rear sections of the elements 140, 152a therewith in a like direction and which in turn will provide for the front sections of said elements to move forwardly acting on the levers 39, 40 in a manner to provide for the elevating of the rear ends of beams 16, 17, 18 and 19 simultaneously with the rear ends of the beams 68, 69, 70. The beam 69 may, when desired, be elevated independently of any one of the other beams on the operation of the lever 120 forwardly and which will provide for crank arm 116 in connection with bar 97 to lift beam 68.

Figure 15:
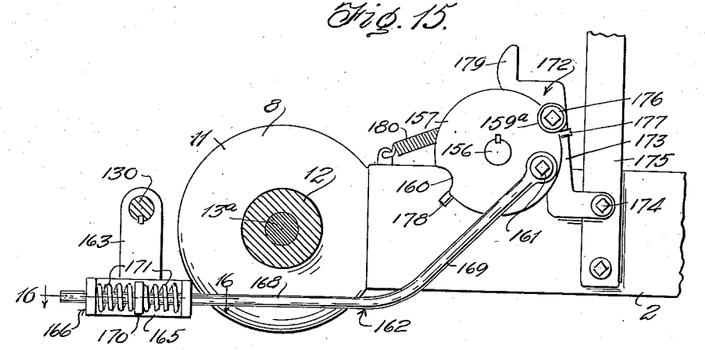
Figure 15 is a section on line 15—15, Figure 2.
Figures 16, 17:
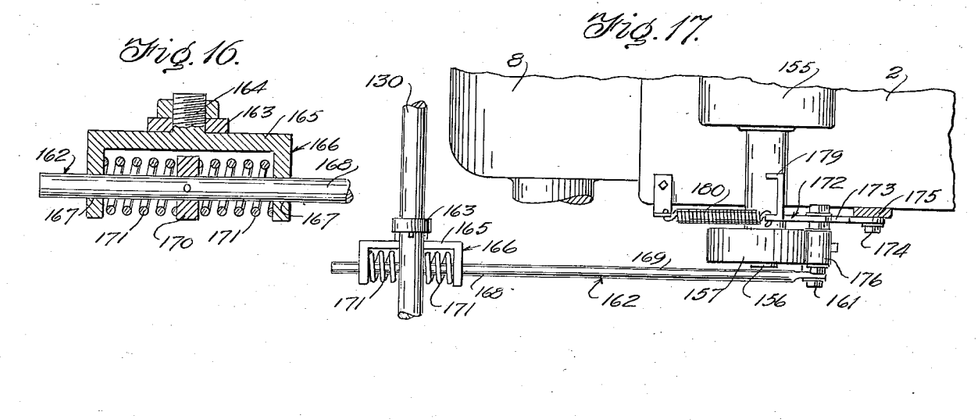
Figure 16 is a section on line 16—16, Figure 15.
Figure 17 is a top plan view of the structure shown in Figure 15.

The means or mechanism for operating the shaft 130, to provide for simultaneously elevating all of the ground working devices clear of the ground, as well as for lowering in unison all of said devices, is of a type that is normally latched in inactive position and when actuated to operate shaft 130 for the purpose referred to it is also latched in active position to maintain all of the ground working devices simultaneously in ground clearing position. The said means includes a housing 155 mounted on the tractor frame 2. Journaled in and extending through the housing 155 is a rotatable shaft 156 carrying a disc 157 at one end and a collar 158 at its other end. The disc 157 constitutes a keeper for a latching member to be referred to. The shaft 156 carries a bevel gear 159 (Figures 4 and 5) which is arranged in housing 155. The disc 157 has formed in its edge a pair of diametrically aligned transverse grooves 159a, 160 (Figure 15). Pivoted to the outer face of disc 157 eccentrically thereof, as at 161 is the forward end of a rearwardly extending angle-shaped operating rod 162 for the shaft 130. The latter is provided with a depending arm 163 to the lower end of which is anchored, as at 164 the base 165 of a horizontally disposed yoke 166 having its sides provided with aligned openings 167. The rod 162 includes a straight rear stretch 168 and a forward stretch 169 which inclines upwardly from the forward end of stretch 168. The latter extends through the aligned openings 167 and is slidably mounted in the yoke 166. The stretch 168 has fixed thereto a collar 170 which is arranged in yoke 166. Positioned on stretch 168 and interposed between the collar 170 and the sides of yoke 166 is a pair of cushioning springs 171. Coacting with the recesses in the edge of the disc 157 is a spring controlled latching structure 172 consisting of an upstanding latching member 173 pivotally connected at its lower end, as at 174 to a post 175. The member 173 has mounted thereon intermediate its ends a laterally disposed roller 176 for selectively seating in the grooves 159a, 160. When roller 176 is mounted in groove 159a, the shaft 156 and disc 157 are normally latched in inactive position. When roller 176 is mounted in groove 160, the shaft 156 and disc 157 are latched in active position. The disc 157 has its edge formed with a pair of spaced radially disposed studs 177, 178 arranged in proximity to one side of grooves 159a, 160 respectively. The studs 177, 178 are what may be termed stops coacting with the latching member 173 for stopping the movement of the discs in opposite directions for limiting the elevating and lowering movements of the ground working devices whereby the disc is latched at desired points. The upper end of the latter has an angularly disposed part 179 constituting a foot tread to enable the member 173 to be shifted forwardly to release roller 176 from a groove. A controlling spring 180 is provided for lever 176 and which is anchored at one end to the tractor frame 2 and at its other end to lever 176. Rotatably supported by the tractor frame 2 lengthwise of the latter is a manually operated driving element (Figures 1 and 2) 181 for the shaft 156. The element 181 includes an elongated shaft 182 (Figures 4 and 5) which is of a length to extend from the front end of tractor frame 2 to within housing 155. The inner end of shaft 182 carries a bevel pinion 183 which meshes with the bevel gear 159. The outer end of shaft 182 is provided with a crank handle 184 to manually facilitate the rotation of shaft 182 in a manner to provide for the operation of shaft 156 in a direction to cause disc 157 to move clockwise whereby shaft 130 will be shifted anticlockwise to provide for the simultaneously elevating of all of the ground working devices clear of the ground when occasion requires, such as when the machine is travelling from point to point when not in ground working position. The moving of shaft 130 anti-clockwise is had against the action of springs 171. Connected to the stem 185 of lift member 133 is a forwardly extending stop member 186 which is slidably connected to shaft 156.

The yokes 54, 55 have their sides provided with aligned openings 187 (Figure 1) for adjusting the position of the shaft 67 vertically. The beams are termed carriers.

The ground working devices at the front of each side, which may be termed front cultivators are readily removable owing to the manner in which such ground working devices are mounted. The front cultivators may be equipped with knives or two plows or four plows and are readily elevated out of the way when planting or plowing middles.

When cultivating there are three plows used behind the tractor for plowing out middles and at the same time plowing out the wheel tracks. When planting or cultivating where there are point rows, one row stopping, the other going on, push levers 112, or 113 clear over forward and raise all plows on that side out of the way so that the other row may be planted or plowed to its end.

When working terrace land, one side can be set to work the row on the side of the terrace and the lower row can be plowed equally as well.

The back plows may be used several different ways. For cultivating the three sweep plows are used, but the front ends of beams are raised to the top holes in the sides for the upper. The said end of the beams will be above the growing crop. The plows are set in a way so that they will plow out all of the wheel tracks and leave the ground loose.

In changing the plows for planting, the beam 69 is taken out and the beams 68, 70 are dropped to the bottom holes in the yokes 54, 55. Shaft 67 is placed in position relative to yokes 54, 55 and beams 68, 70 are to pivotally support these latter.

The beams 68, 70 have connected therewith resilient supports 188 which are connected to the outer sides of the yokes 54, 55 by tension adjusting means 189.

What I claim is:

1. A self-propelled agriculture machine including a frame, a propelling means supported by the frame, front and rear carriers for ground working devices at each side of the frame, means for elevating and lowering a front carrier at one side of the frame independent of the rear carrier at said side, means coacting with the said other means for elevating the front and rear carriers at one side of the frame independent of the carrier at the other side of the frame, and means for simultaneously elevating and lowering all of the said carriers.

2. A self-propelled agriculture machine including a frame, a propelling means supported by the frame, front and rear carriers for ground working devices at each side of the frame, means for elevating and lowering a front carrier at one side of the frame independent of the rear carrier at said side, means coacting with the said other means for elevating the front and rear carriers at one side of the frame independent of the carrier at the other side of the frame, a carrier for a ground working device arranged at the back of the frame disposed between the carriers at the rear of the sides of the frame, means for elevating and lowering said back carrier independent of the others of the carriers, and means for simultaneously elevating and lowering all of the carriers.

3. A self-propelled agriculture machine including a frame, a propelling means supported by the frame, front and rear carriers for ground working devices at each side of the frame, means for elevating and lowering a front carrier at one side of the frame independent of the rear carrier at said side, means coacting with the said other means for elevating the front and rear carriers at one side of the frame independent of the carrier at the other side of the frame, means for simultaneously elevating and lowering all of the said carriers, and said last mentioned means having coacting parts for normally latching it from operation and for latching it in active position.

4. A self-propelled agriculture machine including a frame, a propelling means supported by the frame, front and rear carriers for ground working devices at each side of the frame, means for elevating and lowering a front carrier at one side of the frame independent of the rear carrier at said side, means coacting with the said other means for elevating the front and rear carriers at one side of the frame independent of the carrier at the other side of the frame, a carrier for a ground working device arranged at the back of the frame disposed between the carriers at the rear of the sides of the frame, means for elevating and lowering said back carrier independent of the others of the carriers, means for simultaneously elevating and lowering all of the carriers, and said last mentioned means having coacting parts for normally latching it from operation and for latching it in active position.

5. The invention as set forth in claim 1 having the rear carriers on both sides of the frame disposed in lengthwise relation with respect to the latter and provided with vertically adjustable pivoted forward ends.

6. The invention as set forth in claim 3 having the rear carriers on both sides of the frame disposed in lengthwise relation with respect to the latter and provided with vertically adjustable pivoted forward ends.

7. The invention as set forth in claim 2 having the rear carriers on both sides of the sides of the frame and the said back carrier disposed in lengthwise relation with respect to the frame and provided with vertically adjustable forward ends.

8. The invention as set forth in claim 4 having the rear carriers on both sides of the sides of the frame and the said back carrier disposed in lengthwise relation with respect to the frame and provided with vertically adjustable forward ends.

9. The invention as set forth in claim 1 having the rear carriers at both sides of said frame connected to the means for elevating and lowering them by lift bars and the carriers arranged at the rear of the sides of said frame connected to the means for simultaneously elevating and lowering all of the carriers by lift bars.

10. The invention as set forth in claim 2 having the carriers arranged at both sides of the frame and the said back carrier connected to the means for simultaneously elevating and lowering all of the carriers by lift bars.

11. The invention as set forth in claim 1 having the means for elevating and lowering the front carriers on a side of the frame including a telescopic element having one of its sections connected to the means for simultaneously elevating and lowering all of the carriers.

12. The invention as set forth in claim 2 having the means for elevating and lowering the front carriers on a side of the frame including a telescopic element having one of its sections connected to the means for simultaneously elevating and lowering all of the carriers.

MALCOLME D. DOUGLASS.